(No Model.)
W. H. TUTTLE & R. W. BENEDICT.
HARROW CULTIVATOR.
No. 312,531. Patented Feb. 17, 1885.
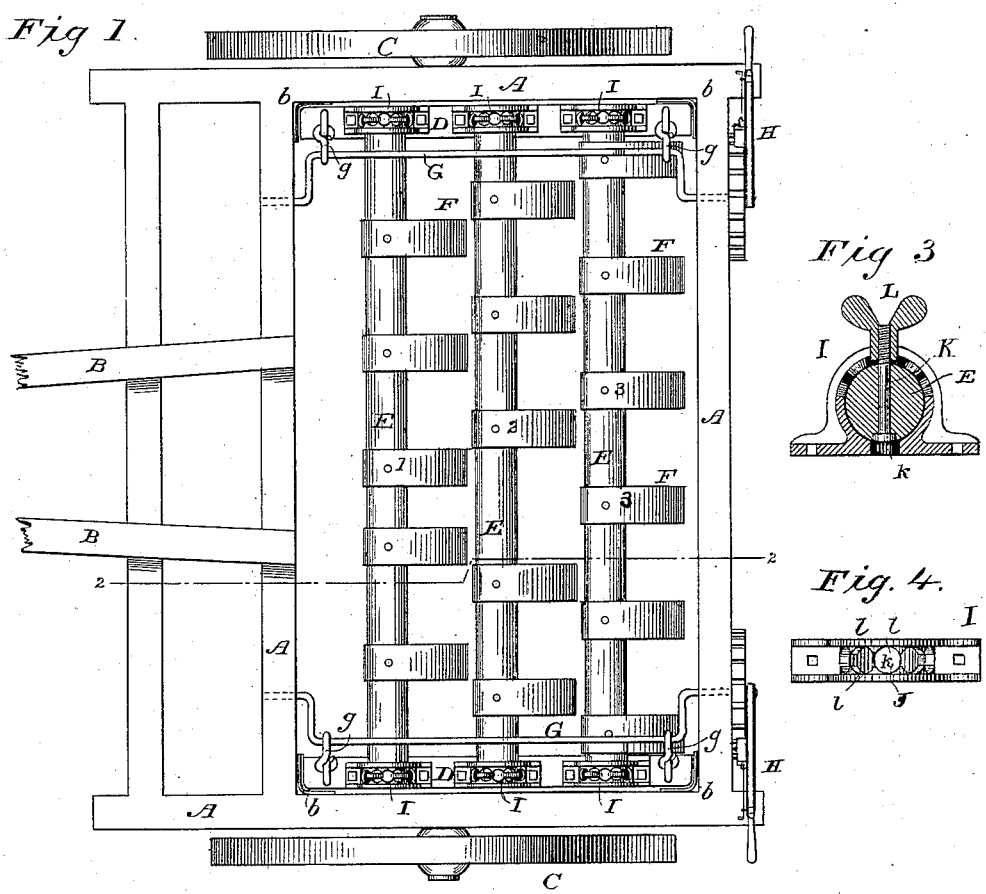
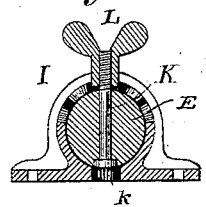
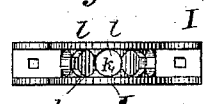
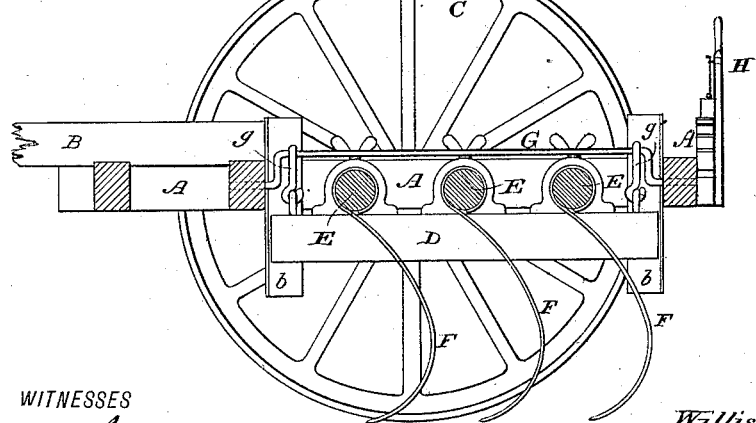
WITNESSES
INVENTORS
Willis H. Tuttle
R. Watson Benedict
By their Attorneys

UNITED STATES PATENT OFFICE.

WILLIS H. TUTTLE AND R. WATSON BENEDICT, OF PERRY, NEW YORK, ASSIGNORS TO SAID TUTTLE.

HARROW-CULTIVATOR.

SPECIFICATION forming part of Letters Patent No. 312,531, dated February 17, 1885.

Application filed June 5, 1882. (No model.)

*To all whom it may concern:*

Be it known that we, WILLIS H. TUTTLE and R. WATSON BENEDICT, both of Perry, in the county of Wyoming and State of New York, have invented certain new and useful Improvements in Harrow - Cultivators, of which the following is a specification.

Our invention relates to improvements in that class of wheeled machines for working the soil in which several gangs or rows of teeth are mounted between the wheels, and the teeth adapted to be adjusted vertically, especially that type of such class of machines in which spring-teeth are employed.

Our objects, mainly, are to provide for adjusting the teeth vertically in such manner that the parallelism of their positions at their various altitudes may readily be maintained, as well as to provide for adjusting the teeth up or down at either end of the entire group or series without like adjustment at the opposite end, to incline the series of teeth transversely to the line of draft and present them properly to the ground being worked, and to provide for independent adjustment of the respective rows of teeth composing the series, so that the teeth may be set by rows to elevate or depress their points.

Our improvements, after being fully described in connection with the accompanying drawings, will be distinctly claimed.

Figure 1 is a plan or top view of a machine in which our improvements are suitably organized. Fig. 2 is a view partly in side elevation and partly in section on the line 2 2 of Fig. 1. Fig. 3 is a sectional view on an enlarged scale, showing in detail the way in which an oscillating tooth-carrying bar is adjustably secured at its end to its supporting-bar; and Fig. 4, a plan view of the box in which the end of the tooth-carrying bar is adjusted.

A rectangular supporting or main frame, A, is provided with a tongue, B, preferably a split tongue, and is mounted by stud-axles upon wheels C C, thus leaving the frame centrally open. A tooth-carrying frame is adjustable supported, so as to be capable of movement up and down beneath and within the frame opening or central space provided between the main-frame bars. The tooth-carrying frame, as shown, is formed by cross-pieces or supporting-bars D D and bars E E E, which are secured to them, and to which the teeth F are attached in rows corresponding in number with the bars. The teeth are such as are usually designated "flat spring-teeth," being composed of suitably - curved plate-springs pointed to correspond in shape with cultivator-teeth at their lower ends, and at their upper ends embracing the bars E, to which they are secured against displacement by screws or otherwise, as usual. The inside or tooth-carrying frame is in this instance supported by and adjusted in the main frame in the following way: At each of the four corners of the main-frame opening is secured a vertical guideway formed by an angle-plate, *b*. The cross-pieces or supporting-bars D D of the tooth-carrying frame are guided in their movements and braced against thrusts by these guideway-plates. Cranked rockshafts G G, spanning the main-frame opening near the sides of this frame, and also crossing above the three tooth-bars, are provided with suitable actuating-levers, H H, and detent devices at the rear of the main frame, and are supported at their front and rear ends, respectively, in front and rear beams of the main frame. Each of these rock-shafts is flexibly connected, as by links *g g*, with that one of the respective bars D D which is located beneath or nearly beneath it. The tooth-carrying frame is thus independently suspended at its ends, so that it may be raised or lowered and secured in a position parallel with that from which it was moved, or may be raised or lowered to a greater extent at one end than at the other and secured in the adjusted position, or be raised only at one end and secured by the lever and detent devices. By adjusting the frame so that it may be secured in various vertical positions in parallel horizontal planes, the teeth may be raised and lowered without affecting their angular relation to the soil, and consequently without in some respects affecting their vibratory motion and action on the soil.

To provide for adjusting the teeth by gangs or rows instead of throughout the entire series, as above described, each of the tooth-bars E is secured at its ends to the bars D D, so that it may be rocked to raise or lower the points of the teeth, and secured in any desired position. Each oscillating tooth-bar is connected in like manner at its opposite ends with the respectively-adjacent bar D of the inside or carrying tooth-frame. In this instance the adjustable connections between the bars D and E are each composed, as clearly shown in Figs. 3 and 4, of a ring-like box or open-ended socket, I, bolted at its base to one of the bars D, and having a peripheral slot, J, at top extending from side to side for, say, half the circumference of the box. A bolt, K, secured to the bar E, projects at its threaded end through the slot J, in which it rocks as the tooth-bar is oscillated. At each of the edges or side walls of the slot a series of curved recesses, $l$, is formed, so that each recess in the one wall of the slot will be diametrically opposite a recess in the other wall. A thumb-nut, L, is formed at its threaded or sleeve portion to span the slot J, and fit in those two of the slot-recesses between which the bolt K may be adjusted as it projects through the slot, thus locking the parts against movement. An opening, $k$, is made in the base of the box I, to admit of inserting the bolt K in place after the end of the bar E has been fitted to the box.

That an attendant may ride upon the machine, a driver's seat is suitably mounted upon it, so as to be located between the levers H H and about over the rear beam of the frame, to allow the driver to reach the levers and adjust the teeth from his seat.

The drawings represent the machine as especially adapted for harrowing the soil. It may be rendered especially serviceable as a cultivator for working the soil simultaneously about both sides of rows of corn, &c., by removing the central tooth (marked 1) in th front row, the curved tooth (marked 2) in the second row, and the two middle teeth (marked 3 3) of the third row. In this way an untoothed space to accommodate a row of plants will be provided in the rear of the space between the two members of the split tongue. The teeth left on either side of the central space constitute rows three deep, extending diagonally outward from front to rear to the right and left of the center. When all the teeth are in place for harrowing, the teeth, with the exception of one in the rear gang, also constitute rows of three, inclining in both directions from or near the center of the machine outward and backward. The advantages of such diagonal arrangement of the teeth are obvious.

It will be readily understood from the above description that the teeth may be adjusted vertically to any desired position to regulate the depth of their penetration into the soil, or to hold them clear of the ground for transportation, and that parallelism in the positions of adjustment may be maintained or not, at the will of the driver, according to whether working level ground, over or upon which the wheels pass in substantially the same horizontal plane, or working with the axis of revolution of the wheels at an inclination to the general surface of the ground, as when one wheel runs in a depression or is supported at a lower level than the other. It will further be understood that not only may any row or gang of teeth be adjusted to raise or lower the points of the teeth independently of any adjustment of other rows of teeth, but that by the rocking adjustment of the teeth by oscillating their carrying-bars in the bars D D, which connect with the raising and lowering mechanism, the series or entire group may be adjusted relatively to said mechanism so as to require more or less rocking movement of the levers H H, or a variation in the range of movement of the raising and lowering mechanism in adjusting the teeth to a given position.

As has been before remarked, it is well known that when the angular relation of vibratory spring-teeth to the soil is changed there is a change in their action on the soil. In our organization the teeth are raised and lowered in parallel horizontal planes, so that a uniform relation to the soil is maintained.

We are aware that a tooth-carrying frame adjustable within and relatively to a main frame in parallel horizontal frames, and having sword or non-vibratory teeth, is shown in patent of Conklin, No. 80,394, and we do not claim such subject-matter; nor do we broadly claim rocking tooth-carrying bars, or a series of such bars independently adjustable. We do not, however, limit ourselves to the precise details of construction illustrated, but we do hereby disclaim the constructions shown in patents of Miller, No. 246,332, Bradford, No. 239,712, and Baker, No. 30,863, and, so far as said patents are concerned, limit our invention accordingly.

We claim as of our invention—

1. The combination of the centrally-open main frame, the inside frame, mechanism for raising and lowering the inside frame into different horizontal working planes parallel with each other, and the vibratory spring-teeth carried by the inside frame, substantially as and for the purpose set forth.

2. The combination, substantially as hereinbefore set forth, of the main frame, the tooth-carrying frame supported within the main frame and having series of teeth arranged in transverse rows thereon, and means for vertically and independently adjusting the tooth-carrying frame at its opposite ends, whereby the series of teeth may be secured in any desired horizontal or inclined position by the adjustment of the one frame within the other, as explained.

3. The combination of the main frame, a tooth-carrying frame, a series of vibratory spring-teeth carried thereby, mechanism for raising and lowering the tooth-carrying frame into different horizontal working planes parallel with each other, the rocking bars of the tooth-carrying frame which separate the teeth into independent rows or gangs, and mechanism for adjusting the rocking tooth-bars independently of the vertical adjustment by rolling them in their bearings, substantially as and for the purpose set forth.

4. The combination of the main frame, the tooth-carrying frame, consisting of the rocking tooth-bars and their supporting-bars, in which the tooth-bars have their bearings, vibratory spring-teeth carried by the rocking tooth-bars, and raising and lowering mechanism connected to the supporting-bars of the tooth-frame, for raising and lowering said frame to different parallel horizontal working planes, substantially as and for the purpose set forth.

5. The combination, substantially as hereinbefore set forth, of the main frame, the tooth-carrying frame, the teeth mounted in independently-rocking gangs or rows, and means for vertically and independently adjusting the tooth-carrying frame at its opposite ends.

6. The combination of the centrally-open main frame, the vertically-adjustable tooth-carrying frame supported and guided in its movements within the main frame, the independent rock-shafts, their levers and detent devices for independently operating the shafts, and the connections between the rock-shafts and the ends of the tooth-carrying frame, substantially as and for the purpose hereinbefore set forth.

7. The combination of the centrally-open main frame, the independent rock-shafts, their levers and detent devices for independently operating the shafts, the guideways at the corners of the main-frame opening, and the tooth-carrying frame linked to the rock-shafts, vertically adjustable in the main-frame opening and guided by said guideways, substantially as hereinbefore set forth.

8. The combination of the rocking tooth-carrying bar, the supporting-bars, the slotted and recessed boxes secured to the supporting-bars, the bolts secured to the ends of the rocking bars, and the thumb-nuts, substantially as hereinbefore set forth.

In testimony whereof we have hereunto subscribed our names.

WILLIS H. TUTTLE.
R. WATSON BENEDICT.

Witnesses:
JOHN F. LATHAM,
FRANK H. WYCKOFF.